United States Patent Office 2,954,383
Patented Sept. 27, 1960

2,954,383
COMPOSITIONS OF MATTER AND METHODS OF PREPARING SAME

Albert Schlesinger, Jackson Heights, and Samuel M. Gordon, Forest Hills, N.Y., assignors to Endo Laboratories Inc., Richmond Hill, N.Y., a corporation of New York No Drawing. Filed July 15, 1957, Ser. No. 671,701

6 Claims. (Cl. 260—326.3)

This invention relates to a class of new compounds which possess analgesic properties and to the method of their preparation. More particularly, it relates to compounds such as 1,1-diphenyl-1,2-dihydroxy-4-aminobutanes and 1,1-diphenyl-1,2-acyloxy-4-aminobutanes, their acid addition salts and the method of their preparation.

These new products were unexpectedly found to possess analgesic properties. They can be represented by the general formula:

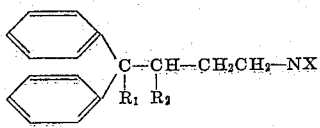

wherein $R_1$ and $R_2$ stand for hydroxy or acyloxy radicals and wherein the unit NX is selected from the group consisting of di-lower alkylamino, piperidyl, morpholinyl, and pyrrolidyl.

The above compounds can be prepared by hydrogenating the corresponding 1-hydroxy-2-butanones, the preparation of which is described in our pending U.S. patent application Serial No. 519,642, filed July 1, 1955. The 1,2-bishydroxy butanes so formed may then be reacted with an acylating agent.

In the preparation of these compounds in accordance with our invention herein disclosed, hydroxy-ketones such as 1,1-diphenyl-1-hydroxy-4-pyrrolidino-2-butanone are first subjected to hydrogenation. The hydrogenation may be carried out at room temperature in the presence of a suitable catalyst, such as platinum oxide, or in even better yields by using sodium-boro-hydride in methanol-water solution. The keto group in 2-position is thereby reduced to form a secondary alcohol corresponding to our general formula, where $R_1$ and $R_2$ are OH.

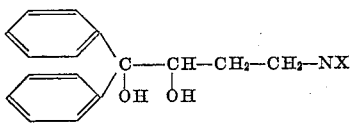

Our invention concerns the preparation of these diols and their acylated derivatives, which possess strong analgesic properties.

The acylated compounds of our invention may be prepared by refluxing these diols, preferably in form of their hydrohalide salts, with an acylating agent. Suitable acylating agents are, for example, acetic-anhydride, propionic-anhydride, formic-acetic-anhydride, acetyl chloride, 4-nitrobenzoyl chloride, carbamyl chloride, etc. It is usually preferred to use a large excess of the acylating agent.

The following examples illustrate the methods of carrying out the present invention, but it is to be understood that these examples are given by way of illustration and not of limitation.

Example I 21 grams of 1,1-diphenyl-1-hydroxy-4-pyrrolidino-2-butanone hydrochloride are dissolved in 500 cc. of methanol, and with stirring there are added dropwise thereto, at room temperature, a solution of 6 grams of sodium-boro-hydride in 100 cc. water. After all of the reducing agent is added, the solution is stirred for an additional hour. Then 20 cc. of concentrated hydrochloric acid is added dropwise, and the solution is evaporated under reduced pressure. The residue is taken up in 500 cc. of water; and this solution rendered alkaline with a 40% sodium hydroxide solution. The 1,1-diphenyl-1,2-bishydroxy-4-pyrrolidino-butane precipitates and is filtered on a Buchner funnel. It can be dissolved in hot benzene and precipitated by adding pentane. M.P. 168° C.

Example II

The 1,1-diphenyl-1,2-bishydroxy-4-pyrrolidinobutane is dissolved in chloroform, and with ice-cooling, hydrochloric acid in ethanol is added thereto until the mixture shows acidity against Congo. The solution is evaporated under reduced pressure, and the formed hydrochloride salt recrystallized from ethanol. M.P. 164°.

Calc: Cl=10.48%. Found: Cl=10.41%.

Example III 20 grams of 1,1-diphenyl-1,2-bishydroxy-4-pyrrolidinobutane hydrochloride and 300 grams of acetic-anhydride are refluxed for one hour. The acetic-anhydride is distilled off under reduced pressure and the residue is dissolved in 200 cc. of boiling acetone, filtered while hot, cooled, and ether added, until the solution becomes turbid. By cooling in an ice bath, the hydrochloride salt of 1,1-diphenyl-1,2-acetoxy-4-pyrrolidino-butane precipitates in crystalline form. M.P. 170°. $C_{24}H_{29}O_4N.HCl$. Calc. Cl=8.2%. Found: Cl=8.21%.

Example IV 2.15 grams of 1,1-diphenyl-1,2-dihydroxy-4-pyrrolidino-butane dissolved in 10 grams of anhydrous pyridine and 20 cc. of ether, and with ice-bath cooling 2 grams of acetyl chloride added thereto, and then refluxed for several hours. The mixture is cooled and 20 cc. of a 10% sodium carbonate solution is added. The ether layer is separated and evaporated under reduced pressure. The residue is dissolved in ether and HCl in ether is added. A white crystalline material precipitates, which is the 1,1-diphenyl-1-hydroxy-2-acetoxy-4-pyrrolidino butane hydrochloride. M.P. 199° C. $C_{22}H_{27}NO_3.HCl$. Calc.: Cl=9.09%. Found: Cl=9.20%.

In accordance with the foregoing general procedures, there may be produced compounds of the invention which are exemplified by the following compounds:

1,1-diphenyl-1,2-bishydroxy-4-dimethylamino butane hydrochloride 1,1-diphenyl-1,2-bishydroxy-4-diethylamino butane hydrochloride 1,1-diphenyl-1,2-bishydroxy-4-piperidino - butane hydrochloride 1,1-diphenyl-1,2-bishydroxy-4-morpholino - butane hydrochloride 1,1-diphenyl-1,2-bisacetoxy - 4 - dimethylamino - butane hydrochloride 1,1-dipheny-1,2-bispropion-oxy-4 - diethylamino - butane hydrochloride 1,1-diphenyl-1,2-bisacetoxy-4 - piperidino - butane hydrochloride 1,1-diphenyl - 1,2-bis-acetoxy-4-morpholine-butane hydrochloride It will be understood that the foregoing description of the invention and the examples set forth are merely illustrative of the principles thereof. Accordingly, the appended claims are to be construed as defining the invention within the full spirit and scope thereof.

We claim:

1. Compounds of the group consisting of the free bases having the general formula:

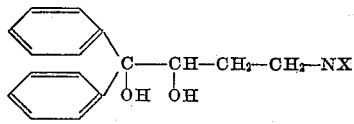

and the free bases having the general formula:

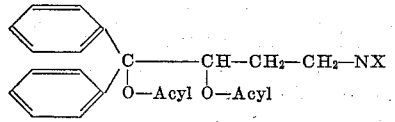

wherein Acyl designates a member of the group consisting of formyl, acetyl, propionyl, nitrobenzoyl and carbamyl, and the unit NX designates a member of the group consisting of di-lower alkylamino, piperidino, morpholino and pyrrolidino radicals.

2. Pharmaceutically acceptable acid addition salts of the free bases in accordance with claim 1.

3. Method of preparing the free bases having the formula:

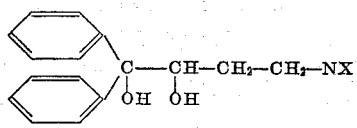

wherein the unit NX designates a member of the group consisting of di-lower alkylamino, piperidino, morpholino and pyrrolidino radicals, which comprises mixing a compound having the general formula:

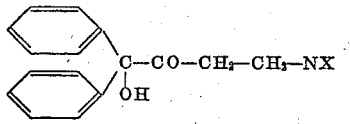

wherein the unit NX designates a member of the group consisting of di-lower alkylamino, piperidino, morpholino and pyrrolidino radicals, with sodium boro-hydride in a methanol-water solution at room temperature, allowing them to interact with each other, and isolating the formed free base.

4. The method of preparing the hydrochloride salt of a free base having the formula:

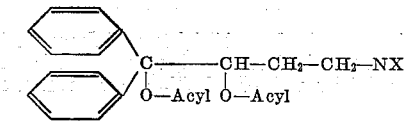

wherein acyl designates a member of the group consisting of formyl, acetyl, propionyl, nitrobenzoyl and carbamyl, and the unit NX designates a member of the group consisting of di-lower alkylamino, piperidino, morpholino and pyrrolidino radicals, which comprises heating a hydrochloride salt of a free base having the formula:

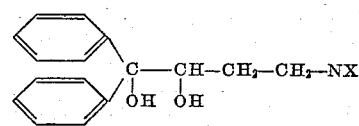

wherein the unit NX designates a member of the group consisting of di-lower alkylamino, piperidino, morpholino and pyrrolidino radicals, with a member of the group consisting of formic anhydride, acetic anhydride, propionic anhydride, nitrobenzoyl chloride and carbamyl chloride at reflux temperature.

5. 1,1-diphenyl-1,2-bishydroxy - 4 - pyrrolidino butane hydrochloride.

6. 1,1-dipheny-1,2-bisacetoxy - 4 - pyrrolidino butane hydrochloride.

No references cited.